Patented Sept. 12, 1950

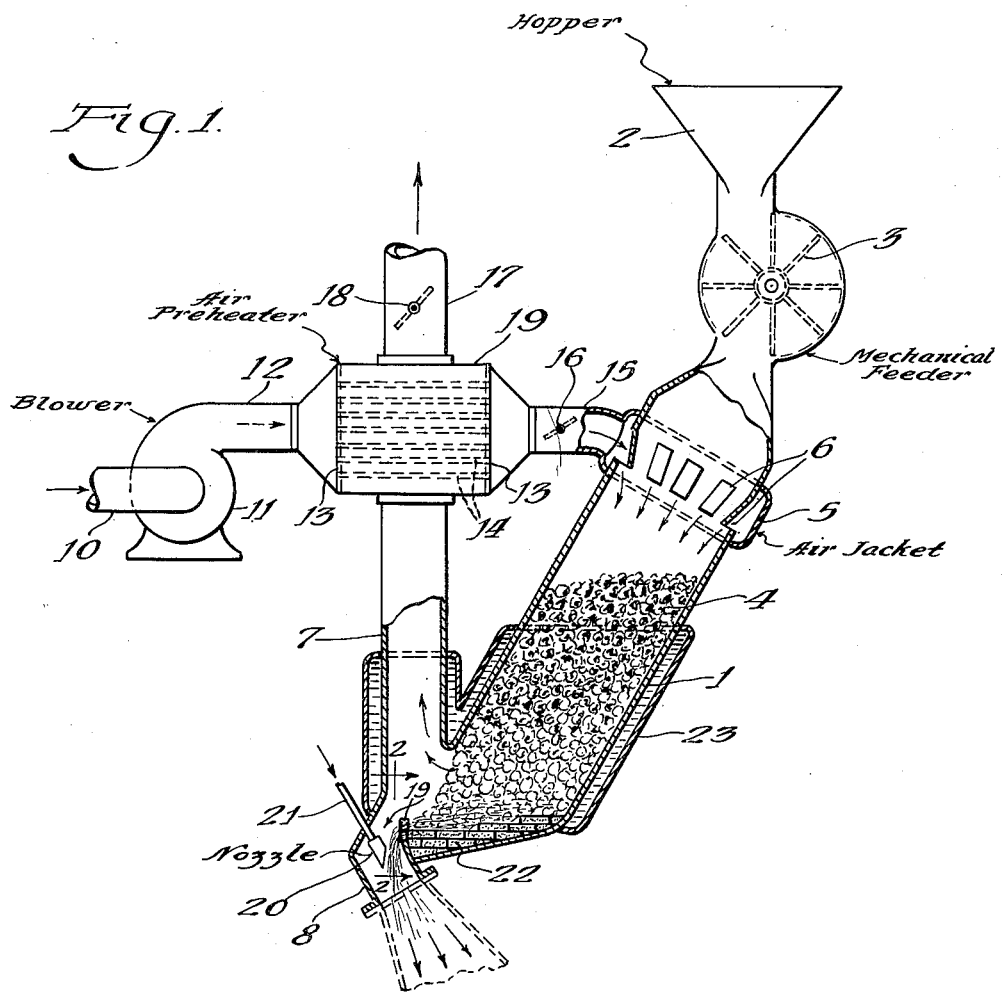
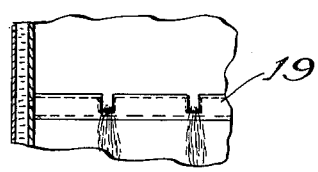

2,521,830

UNITED STATES PATENT OFFICE 2,521,830

MINERAL WOOL FURNACE

Robert B. Collins, Downers Grove, Ill., assignor to Universal Oil Products Company, Chicago, Ill., a corporation of Delaware Application June 20, 1946, Serial No. 677,954

6 Claims. (Cl. 49—1)

This invention relates to an improved furnace or cupola of a type employed for melting various minerals such as slag, lime stone, rock and the like, in the production of mineral wool. More particularly, the furnace is of the down draft type wherein the oxidizing gas stream is passed downwardly, or concurrent, with the movement of the minerals charged. In addition, the improved cupola is specifically designed to have the mineral wool-like fibers formed within an enclosed passageway which is built integrally with the furnace itself.

It is a principal object of this invention to provide a furnace which minimizes caking or clinkering of mineral slag on the bottom of the melting chamber due to undesirable cooling.

It is another object of the improved design to have enclosed, or internally placed, blasting nozzles whereby they become a distinct part of the furnace itself.

It is a still further object of the invention to have the melted slag stream enclosed in such a manner that a hot combustion gas stream, from the melting chamber of the furnace, will envelop the molten stream as it is withdrawn therefrom.

In the usual furnace or cupola for producing mineral wool fibers, the forced draft or oxidizing gas stream enters near the bottom of the cupola through suitable tuyères and is forced upwardly through the mineral solids bed. This air stream, entering near the bottom, however, tends to cool the molten material such that a solid cake, or clinker of slag, tends to build up on the bottom of the melting chamber of the cupola. This material, by building up on the bottom, soon disrupts the even flow of the molten material out of the tap holes or hole, provided at the bottom of the melting chamber, for withdrawing the molten stream of mineral material. Also, in the customary or usual type of mineral wool melting furnace the molten stream is allowed to flow freely through the outside air and in front of blast nozzles which may employ high pressure steam or compressed air and which are mounted so as to blow the molten stream into long wool-like fibers. The wool is blown into an adjacent blowing tube or room, which by necessity is placed closely to the cupola such that it receives the mineral wool fibers directly from the molten stream and blast nozzles. However, the blast nozzles are not normally enclosed nor is the blowing chamber directly attached to the cupola such that hot combustion gases therefrom may be pulled into the blowing room or blowing tube to envelop the molten stream and the space where the long wool-like fibers are being formed.

The improved furnace comprising this invention is constructed in a manner to have the forced draft pass downwardly through the bed of mineral slag and coke such that a high temperature zone exists at the lower end of the melting chamber with hot combustion gases directly impinging the molten material in the bottom of the chamber. Thus, it may be seen that hot combustion gases rather than relatively cool air, is directed to the bottom of the melting chamber and the formation of cool slag on the bottom of the furnace is minimized. The design of the improved furnace also provides for dividing the hot combustion gas stream from the lower end of the melting chamber. The major portion of the hot combustion gases is discharged through an outlet duct to a suitable heat exchanger or air preheater and to an outlet stack. A small portion of this stream of hot combustion gases, however, is drawn by the fiber-forming blast nozzles into the space wherein the mineral wool fibers are being formed by the blast nozzles. The molten mineral stream and the blast nozzles are entirely enclosed within a relatively short duct or passageway which in turn is adapted to connect with a blowing tube or chamber, such that the mineral wool fibers are formed in the presence of a hot stream of combustion gases.

One form of the improved furnace comprises a slanting or angularly positioned melting chamber, mechanical means to charge raw minerals and coke to the upper end of the melting chamber and to maintain a relatively deep bed of mineral solids therein, an air-jacket and tuyères surrounding the upper portion of said chamber that are operative to charge a forced air stream in a generally downward direction through the mineral bed, an outlet duct for hot combustion gases from the lower end of said melting chamber, a notched liquid-retaining member suitable for providing streams of molten mineral matter from the lower end of said melting chamber, and a short outlet duct, or passageway, to enclose the molten stream or streams, with said passageway being adapted to withdraw a portion of the hot combustion gases from the melting chamber in such a manner that they will envelop the molten mineral streams and the subsequently formed, wool-like fibers. Blast nozzles, employing high pressure steam or compressed air, are mounted within the enclosed passageway and operate to blow the molten stream into fine wool-like fibers and at the same time produce suction for withdrawing hot combustion gases into the passageway. The improved furnace is also adapted to being attached directly to a blowing tube or chamber which may receive the mineral wool as it is formed, without its being subjected to the cooling action of outside air or other adverse external conditions. Quick cooling of the mineral stream following the blowing operation leads to the formation of an excessive amount of "shot" and short fibers. Further, in the preferable embodiment of the furnace, the principal stream of hot combustion gases is discharged from the melting chamber and passed to a heat exchanger, or air preheater, whereby the fresh air stream, being charged to the upper end of the cupola and to the melting chamber, becomes preheated prior to its passage downwardly through the mineral bed maintained within the melting chamber of the furnace.

The accompanying drawing and the following description thereof will serve to illustrate diagrammatically the construction of the improved furnace as well as show additional advantages in its operation.

Figure 1 of the drawing is an elevational view, partially in section, of the furnace and accompanying accessory equipment.

Figure 2 of the drawing is a fragmentary view of the lower end of the melting chamber as indicated by the line 2—2 in Figure 1.

Referring now to the drawing, the melting chamber 1 is constructed such that it is positioned at a slight angle, with mineral materials and coke being charged to its upper end in the usual manner. In the particular embodiment illustrated, a hopper 2 serves to receive crushed minerals and pass them to a mechanical feeding means such as a rotary-paddle feeder 3. The internal wheel of the feeder 3 may be driven by mechanically powered means (not illustrated), which may be regulated to pass crushed solids continuously to the melting chamber 1 and maintain a substantially deep mineral bed 4 within the furnace.

An air jacket 5 surrounds the upper periphery of the melting chamber 1, while a plurality of tuyères, or openings, 6 in turn serve to distribute a forced air stream downwardly through the mineral bed 4 within the melting chamber 1. The downwardly moving air stream provides for the burning and melting of the mineral solids and coke which are charged to the furnace, such that molten minerals trickle to the bottom of the chamber 1 where it is subsequently withdrawn and blown into wool-like fibers. A major portion of the hot combustion gases resulting from the burning within the mineral bed are discharged into an outlet duct 7, while a small portion of the hot gases are withdrawn through a lower duct or passageway 8 that projects downwardly from the melting furnace and encloses the molten mineral streams that descend from the flow of the chamber 1.

The outlet duct 7 is connected with an air preheater 9 such that air being charged to the upper end of the melting chamber 1 may be preheated prior to its passage to the mineral bed 4 therein. The air preheater need not be of any specific type, but one which will provide indirect heat exchange between two gaseous streams. In the particular embodiment shown, fresh air is drawn through duct 10 into blower 11 and discharged therefrom by way of duct 12, which in turn connects with the air preheater 9. Tube sheets 13 and a plurality of tubes 14 within the preheater 9, provide means for the fresh air to pass therethrough and receive heat from hot combustion gases surrounding the small tubes 14 and entering the preheater 9 from the outlet duct 7. The heated, forced draft, air stream passes from the preheater 9, to the air jacket 5, by way of duct 15 having mounted therein an adjustable valve or damper 16. The hot combustion gases leave the preheater 9 by way of duct 17, having an adjustable valve or damper 18, and pass to an outlet stack, or if it is so desired, the gases may be passed to suitable heat recovery means, such as a waste heat boiler or steam generator, prior to their discharge from an outlet stack.

At the lower end of the melting chamber 1 and at the entrance to the outlet duct 8, there is positioned a notched wall or retaining member 19, which serves to discharge the molten minerals in relatively narrow streams. Figure 2 of the drawing shows a partial elevational view of the retaining member 19 and notches provided therein for discharging the molten material. The wall 19 may be provided with an internal liquid cooling stream, in order that hot molten slag will not stick to it or melt it down. Blast nozzles 20 are mounted internally within the duct 8 and in front of each of the mineral streams such that high pressure steam or compressed air may impinge directly on the falling stream and cause the formation of long wool-like fibrous material. High pressure steam, compressed air, or other gaseous material under pressure is passed to the blast nozzles 20 by way of conduit 21.

As may be noted in the drawing, duct 8 encloses the molten mineral streams and the blast nozzles 20 and is constructed and adapted for direct attachment to an enclosed blowing tube or blowing chamber which in turn will receive the mineral wool fibers as they are formed from the lower end of the furnace.

Refractory material 22, suitable for high temperatures, is placed at the bottom of the melting chamber 1 and serves to protect and insulate the outer shell of the chamber 1 from the hot molten material therein. Surrounding the exterior of the lower wall of the chamber 1 and the lower end of the duct 7, there is provided an enclosed water jacket 23 in order that the lower walls are somewhat cooled and protected from melting action of the burning mineral bed and the hot gases within the lower portion of the melting chamber 1. Water may be continuously circulated through this water packet by means of a water pump and inlet and outlet lines connecting thereto, and which need not be illustrated in this drawing.

When the improved furnace of this invention is charged and made ready for operation, it may be used for long continuous runs. The mineral bed 4 is maintained by a continuous charge from the hopper 2 and feeding device 3, while molten streams are continuously withdrawn through the notched retaining member 19 to pass in front of the blast nozzles 20 and be blown into mineral wool fibers. The wool-like fibers which leave the lower end of the furnace, may be sprayed with a coating or binding material in a further processing step, or they may be gathered substantially as formed within the attached blowing chamber without any additional treatment.

The accompanying drawing and above description serve to illustrate in a basic manner the improved features and construction of the furnace, for it is obvious that many modifications may be made in specific details of the furnace itself or in the attached accessory parts. For instance, the melting chamber need not be positioned at an angle, but may be made vertical with the outlet duct 7 being taken off laterally or at an angle with respect to the melting chamber. The dampers 16 and 18 need not be of the type illustrated or they need not be placed in the inlet and outlet ducts at the particular spots shown; however, the use of some type of damper is advisable to obtain proper regulation of the air streams through the furnace. Also, the construction of the tuyères 6, or the retaining wall member 19, or other specific details may obviously be modified. As for the accessory parts to the improved cupola, such as the mechanical feeder, the air preheater and the like, it is possible to substitute other types or equivalents, as may have been noted or may be obvious to the engineer.

I claim as my invention:

1. A furnace for the production of mineral wool, comprising in combination, a melting chamber, means to charge minerals to said chamber and maintain a relatively deep bed of said minerals therein, means to distribute an oxidizing gas stream to the top of said chamber above said bed, outlet means for a portion of the hot combustion gases from the lower end of said chamber, and means for separately discharging molten streams of mineral matter from the lower end of said chamber with another portion of said hot combustion gases.

2. A melting furnace of the class described comprising an angularly positioned melting chamber, means to charge crushed mineral material to said chamber and maintain a relatively deep bed thereof in the chamber, an air inlet and distributing means to the upper end of said chamber above said bed, an outlet for hot combustion gases from the lower end of said melting chamber, means for separately discharging narrow, molten streams of minerals from the lower end of said melting chamber, an enclosing duct for said molten streams at the lower end of said melting chamber, and blast nozzles positioned internally in said duct for blowing said molten mineral streams into wool-like fibers.

3. A melting furnace of the class described, comprising an angularly positioned melting chamber adapted to maintain a mineral bed therein, mechanical feed means communicating with the upper end of said chamber, an air inlet and air distributing means surrounding the top of said melting chamber above said bed, said distributing means adapted to pass the air downwardly through the mineral bed in said chamber, a hot combustion gas outlet at the lower end of said chamber, a discharge duct connecting with said combustion gas outlet, a second discharge duct connecting with first said discharge duct and the lower end of said melting chamber, blast nozzles positioned within said second duct at said molten streams and said second duct being adapted and arranged to enclose said molten streams and to withdraw a portion of said hot combustion gases from said melting chamber.

4. A melting furnace of the class described, comprising in combination, an angularly positioned melting chamber adapted to maintain a relatively deep bed of mineral materials therein, an inlet at the upper end of said chamber, a mechanical feeder connecting with said inlet and suitable for charging said mineral materials to said furnace, an air jacket surrounding the upper portion of said chamber, a plurality of tuyères between said jacket and said melting chamber above said bed, an air blower and an air feed duct connecting with said air jacket, an outlet duct for hot combustion gases connecting with the lower end of said melting chamber, control dampers in each of said ducts, an air preheater connecting with said hot gas outlet duct and said air feed duct whereby heat is transferred to the air being charged to said melting chamber by said blower, means to withdraw molten mineral streams and a portion of the hot combustion gases from the lower end of said melting chamber and blast nozzles operating with last said means to form mineral wool fibers from said molten streams in the presence of said hot combustion gases.

5. A melting furnace of the class described, comprising in combination, an angularly positioned melting chamber adapted to maintain a relatively deep bed of mineral materials therein, an upper inlet to said chamber, a mechanical feeder connecting with said inlet and suitable for charging said mineral materials to said furnace, an air jacket surrounding the upper portion of said chamber, a plurality of tuyères between said jacket and said melting chamber above said bed, an air blower and an air feed duct connecting with said air jacket, an outlet duct for hot combustion gases connecting with the lower end of said melting chamber, control dampers in each of said ducts, an air preheater connecting with said hot gas outlet duct and said air feed duct whereby heat is transferred to the air being charged to said melting chamber through said tuyères, a notched retaining wall at the lower end of said melting chamber, said wall being operative to discharge molten streams of mineral matter from the bottom of said melting chamber, a second outlet duct communicating with the lower end of said melting chamber and said hot combustion gas outlet duct, blast nozzles positioned within said second outlet duct with said duct being arranged to enclose said molten streams and to withdraw a portion of said hot combustion gases from said melting chamber whereby mineral wool fibers are formed in a hot gaseous stream.

6. A melting furnace of the class described comprising an angularly positioned melting chamber, means for charging solid material to the upper end of the chamber, means for introducing an oxidizing gas to the upper portion of the chamber to pass downwardly through the chamber, a wall extending upwardly from the bottom of said chamber, spaced notches in the upper edge of said wall, an outlet duct connected to the lower portion of the chamber above said wall, said duct having a downwardly extending portion forming with said wall a second outlet duct at the lower end of said chamber, and blast nozzles positioned within said second duct.

ROBERT B. COLLINS.

REFERENCES CITED

The following references are of record in the file of this patent:

UNITED STATES PATENTS

| Number | Name | Date |
|---|---|---|
| 1,656,828 | Powell | Jan. 17, 1928 |
| 1,904,781 | Crawford | Apr. 18, 1933 |
| 2,057,393 | Powell | Oct. 13, 1936 |
| 2,131,599 | Shrum | Sept. 27, 1938 |
| 2,172,153 | McClure | Sept. 5, 1939 |
| 2,178,871 | Drill | Nov. 7, 1939 |